United States Patent [19]
Ruemekorf

[11] Patent Number: 6,164,087
[45] Date of Patent: Dec. 26, 2000

[54] APPARATUS FOR THE CLEANING OF WASTE STREAMS

[75] Inventor: Ray Sircy Ruemekorf, Rosmalen, Netherlands

[73] Assignee: Niro Process Technology B.V., 's-Hertogenbosch, Netherlands

[21] Appl. No.: 09/249,951

[22] Filed: Feb. 12, 1999

[30] Foreign Application Priority Data

Feb. 12, 1998 [NL] Netherlands ............................ 1008290

[51] Int. Cl.⁷ ............................ B01D 35/18; B01D 3/00; B01D 9/04
[52] U.S. Cl. ............................ 62/532; 310/175; 310/774; 203/10; 202/202; 159/47.3
[58] Field of Search ............................ 62/601, 532, 541; 210/175, 774; 203/10; 202/202; 159/47.3

[56] References Cited

U.S. PATENT DOCUMENTS

| | | | |
|---|---|---|---|
| 3,962,076 | 6/1976 | Hess et al. ............................ | 210/175 |
| 3,992,900 | 11/1976 | Campbell ............................ | 62/541 |
| 4,713,089 | 12/1987 | Robbins ............................ | 55/52 |
| 5,174,859 | 12/1992 | Rittof et al. ............................ | 162/29 |
| 5,980,694 | 11/1999 | Apeldoorn et al. ............................ | 202/152 |

FOREIGN PATENT DOCUMENTS 7802338  9/1978  Netherlands .

Primary Examiner—William Doerrler
Attorney, Agent, or Firm—Handal & Morofsky

[57] ABSTRACT

An apparatus for purifying waste streams having water, dissolved noxious substances and volatile organic compounds, comprising a distillation unit having distillate and bottoms products, a freeze-concentration unit and a processing unit. The distillate product is processed in the processing unit and the bottoms product is processed in the freeze-concentration unit, where purified water is extracted.

14 Claims, 1 Drawing Sheet

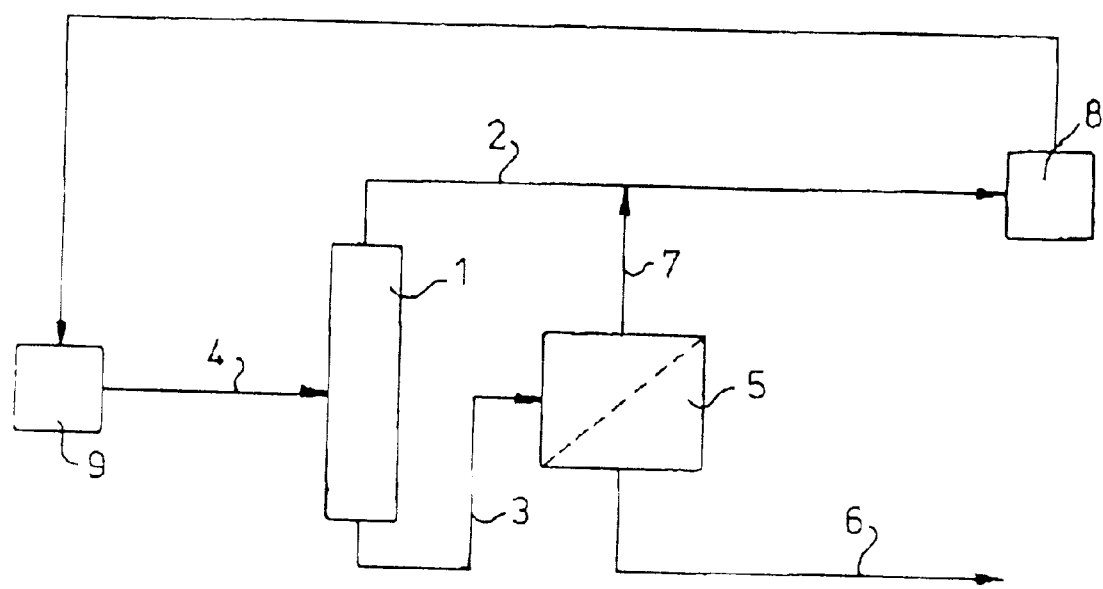

APPARATUS FOR THE CLEANING OF WASTE STREAMS

The invention relates to an apparatus for the processing of waste streams consisting of water containing dissolved noxious substances and volatile organic compounds, which may only be disposed of after incineration. The heating of the water to combustion temperature uses a lot of energy. The selective removal of water gives a great energy saving, Freeze-concentration is a method that is particularly suitable for this.

The increasing concentration of noxious substances in the waste stream gives problems during the freeze-concentration. The waste stream can become supersaturated with solid matter (salts). By centrifuging the sediments, for instance, these solids can be removed from the waste stream and transported separately to an incinerator, making the problem controllable The waste stream can also consist of substances which remain in solution. It is uneconomical to concentrate these substances, as they lower the freezing point, whereby the investment costs in the cooling installation increase, as does the energy use of the freeze-concentration installation.

The object of the present invention is provide an apparatus for the processing of a waste stream, wherein the energy use can be reduced by lowering the water content of the waste stream before processing.

To this end, the apparatus according to the present invention is in that it comprises a distillation unit with a first drainage pipe for the draining of the distillate to a processing unit and a second drainage pipe which is connected to a freeze-concentration unit, which freeze-concentration unit comprises a water drain, as well as a drainage pipe for draining the freeze-concentrate to the processing unit.

As the distillation unit first removes the volatile compounds from the waste stream, the freeze-concentration unit can be successfully applied. Without pre-treatment of the waste stream by the distillation unit, the volatile organic compounds, such as alcohol and other organic compounds, would lower the freezing point of the waste stream to such an extent that no effective rise in concentration could take place using freeze-concentration. By distillation, however, the volatile compounds and some of the noxious substances are removed from the waste stream. The distillate is supplied to the processing apparatus, which preferably comprises an incinerator. The volatile organic compounds are easily combustible so that, during incineration, energy can be saved. The watery residue from the distillation column is then supplied to the freeze-concentration unit where pure water can be extracted. The freeze-concentrate from the freeze-concentration unit can be supplied to the processing unit.

By the raising of the freezing point as a result of the distillation step, from approximately −17° C. to approximately −4° C., for example, the freeze-concentration unit can profitably remove more water, and reduce the fuel use during incineration of the waste stream by 67%.

In an embodiment of the apparatus according to the present invention, the supply pipe of the distillation unit comprises a heat exchanger which is thermally coupled to the incinerator. The energy use of the apparatus can be further reduced in this way.

An example embodiment of the apparatus according to the invention will be elucidated below with reference to the single FIGURE.

FIG. 1 shows a distillation column 1 which is connected by the first drainage pipe 2 to a processing unit 8, such as an incinerator, and which is connected by a second drainage pipe 3 to a freeze-concentration unit 5. A suitable freeze-concentration unit is described, for example, in the Dutch patent application no. 81.04086 and no. 71.06457. The freeze-concentration unit 5 comprises a water drain 6 for the removal of purified process water and the drainage pipe 7 for supply of the freeze-concentrate to the processing unit 8. A waste stream is supplied to the distillation column 1 via a supply pipe 4, whereby a construction is given below in the form of an example.

As an example, a waste stream is used with methanol in it, as would be given off in the production of plastic. The organic compound could be any other volatile solvent that is used in such chemical processes. The waste stream also comprises water and byproducts such as salts and noxious substances which should be transformed before processing. In this example it is assumed that the processing apparatus comprises an incinerator. The waste stream comprises 19.5% weight methanol, 5% weight sodium chloride and 1% weight tetrahydrofuran, with the balance formed by water. With the help of a simple distillation process, most of the methanol is removed and possibly a small amount of the tetrahydrofuran. The concentrations of the various steps of the processing, according to the attached FIGURE, is shown in the table below, Here, the throughput of pipe 4 is given in the second column, the throughput of pipe 2 in the third column, the throughput of pipe 7 in the fourth column and the throughput of pipe 6 in the fifth column.

|  | Supply dist. pipe 4 | | drainage dist. to oven pipe 2 | | drainage dist. to FC pipe 3 | | drainage FC to oven pipe 7 | | drainage FC pipe 6 | |
| --- | --- | --- | --- | --- | --- | --- | --- | --- | --- | --- |
|  | kg/h | % weight | kg/h | % weight | kg/h | % weight | kg/h | % weight | kg/h | % weight |
| Methanol | 195 | 19.5 | 194 | 99.5 | 1 | 0.2 | 1 | 0.3 | 0 | 0 |
| NaCl | 50 | 5.0 | 0 | 0 | 50 | 6.2 | 50 | 16.4 | 0 | 0 |
| Organic compound (tet) | 10 | 1.0 | 1 | 0.5 | 9 | 1.1 | 9 | 3.0 | 0 | 0 |
| Water | 745 | 74.5 | 0 | 0 | 745 | 92.5 | 245 | 80.3 | 500 | 100 |
| Total | 1000 | 100 | 195 | 100 | 805 | 100 | 305 | 100 | 500 | 100 |

The amount of tetrahydrofuran which is taken with the methanol into distillation column 1 is not important as this goes directly to the incinerator 8. At the second drainage pipe 3 of the distillation column 1, the concentration of methanol is only 0.2% weight. The freezing point of the solution removed by pipe 3 is −4° C. compared to the freezing point of the solution, supplied to the distillation column 1 by pipe 4, of around −17.5° C. Due to this rise in freezing point, the freeze-concentration unit 5 can extract more than 60% of the remaining water as purified water via the water drain. The freeze-concentrate can be mixed with the methanol via pipe 7 and they can be supplied to the incinerator together.

The energy saving during use of the incinerator is considerable and comprises a reduction in the fuel use of approx. 67% by the reduced water concentration of the waste stream supplied to the incinerator 8. The total energy saving, including electricity needed to run the freeze-concentration unit 5, is about 65%. The excess heat of the incinerator 8 can be used to warm the volatile part of the supplied waste stream, using heat exchanger 9, as shown schematically in the single FIGURE. The melted ice from the freeze-concentration apparatus 5 could be used as cooling liquid for the incinerator 8.

What is claimed is:

1. An apparatus for purifying waste streams having water, dissolved noxious substances and volatile organic compounds, comprising a distillation unit (1), said distillation unit having a waste stream supply pipe, a first drainage pipe (2) and a second drainage pipe (3), said first drainage pipe connecting to a processing unit and said second drainage pipe connecting to a freeze-concentration unit (5), said freeze-concentration unit comprising a water drainage pipe (6) and a freeze-concentrate drainage pipe, (7) said freeze-concentrate drainage pipe connecting to the processing unit (8).

2. An apparatus according to claim 1, wherein the processing unit (8) comprises an incinerator.

3. An apparatus according to claim 2, further comprising a heat exchanger thermally coupling said waste stream supply pipe (4) and the incinerator (8).

4. A method for cleaning waste streams, which comprises:
   a) supplying a waste stream containing dissolved noxious substances and volatile organic compounds to a distillation unit;
   b) distilling the waste stream in the distillation unit;
   c) removing a distillate from the distillation unit to a processing apparatus;
   d) processing the distillate in the processing apparatus;
   e) supplying a watery residue from the distillation unit to a freeze-concentration unit;
   f) extracting a process water and a freeze-concentrate from the freeze-concentration unit;
   g) removing the process water from the freeze-concentration unit; and
   h) removing the freeze-concentrate from the freeze-concentration unit.

5. Method according to claim 4, wherein the processing unit comprises an incinerator.

6. Method according to claim 5, wherein the supply pipe of the distillation unit comprises a heat exchanger which is thermally coupled to the incinerator.

7. A method as in claim 4, further comprising:
   i) processing the freeze-concentrate in the processing apparatus.

8. A device for treating and removing the water from a multi-component feed stream having water as one of its components, comprising:
   a) a distillation unit having an inlet, a distillate discharge outlet and a bottoms discharge outlet, said inlet receiving said multi-component feed stream;
   b) a freeze-concentration device having an inlet, a freeze-concentrate discharge outlet and a water discharge outlet, said inlet being connected to the bottoms discharge outlet, whereby said freeze-concentration device receives the bottoms discharge from the distillation unit; and,
   c) a processing device having an inlet, said inlet being connected to the freeze-concentrate discharge outlet, whereby said waste-processing device receives the freeze-concentrate discharge from the freeze-concentration device.

9. A device as in claim 8, wherein said processing device inlet is connected to the freeze-concentrate discharge outlet and the distillate discharge outlet, whereby said waste-processing device receives the freeze-concentrate discharge from the freeze-concentration device and the distillate discharge from the distillation unit.

10. A device as in claim 8, wherein said multi-component feed stream further comprises dissolved contaminants.

11. A device as in claim 8, wherein said multi-component feed stream further comprises one or more volatile organic compounds.

12. A device as in claim 8, wherein said processing device comprises an incinerator.

13. A device as in claim 12, further comprising:
   d) a heat exchanger thermally coupling said processing device and said multi-component feed stream, whereby heat transfer occurs prior to said multi-component feed stream being received by said distillation unit.

14. A method for cleaning waste streams, which comprises:
   a) supplying a waste stream containing dissolved noxious substances and volatile organic compounds in a supply pipe to a distillation unit;
   b) distilling the waste stream in the distillation unit;
   c) removing a distillate from the distillation unit to an incinerator;
   d) incinerating the distillate in the incinerator and causing heat transfer through a heat exchanger thermally coupling the incinerator with the supply pipe to the distillation unit;
   e) supplying a watery residue from the distillation unit to a freeze-concentration unit;
   f) extracting a process water and a freeze-concentrate from the freeze-concentration unit;
   g) removing the process water from the freeze-concentration unit; and
   h) removing the freeze-concentrate from the freeze-concentration unit.

* * * * *